3,037,846
DECABORANE RECOVERY
David J. Mann, Dover, N.J., and Herbert C. Kaufman, West Haven, Conn., assignors, by mesne assignments, to Thiokol Chemical Corporation, a corporation of Delaware
No Drawing. Filed Sept. 6, 1955, Ser. No. 532,744
4 Claims. (Cl. 23—204)

This invention relates to a process for the recovery of decaborane from dilute solution and to novel compositions of matter which have utility in this process. More particularly, it relates to the recovery of decaborane from dilute solutions in the form of addition compounds with amines and recovery of the decaborane from the addition compounds.

In the manufacture of pentaborane and decaborane by the pyrolysis of diborane, for example, as described by McCarthy et al. J. Am. Chem. Soc., 73, 3138–43, approximately 40 percent to 60 percent of the diborane is converted to sold boron hydrides, which may contain up to about 25 percent by weight of decaborane.

The solid products may be recovered by dissolving them in a suitable solvent, for example, kerosene or other normally liquid saturated hydrocarbon, in order to clean the apparatus. However, previously there has been available no satisfactory method for the recovery of decaborane from the solution. Losses of the desired product on distillation are prohibitive and decaborane can not be recovered satisfactorily from the solution.

Suitable solvents for the recovery of decaborane according to the present invention include normally liquid saturated hydrocarbons, for example, kerosene, straightrun gasoline, petroleum naphtha, n-heptane, 2,2,4-trimethylpentane, cyclohexane, methylcyclopentane, methylcyclohexane, ethylcyclopentane and the like.

The process of the present invention is based on the discovery that decaborane forms addition compounds with aliphatic and alicyclic amines which are generally solids, not readily soluble in organic solvents, and which precipitate on the addition of the amine to the decaborane solution. These novel addition compounds are readily decomposed by treatment with dilute aqueous mineral acids, for example, hydrochloric or sulfuric acid, the decaborane beng precipitated while the amine remains in aqueous solution as its hydrochloride, sulfate or other mineral acid salt.

The process of the present invention is carried out by the addition of a suitable amine directly or dissolved in a suitable solvent to the solution of decaborane. The addition can be advantageously carried out at about room temperature or at temperatures down to −30° C. or lower. Operation at about 0° C. is particularly convenient. About one mole of mono-basic amine per mole of decaborane is a suitable proportion. Less amine may remove the decaborane only incompletely while a great excess is unnecessary. Any excess amine remains in solution while the addition compound precipitates. The complex is removed by decantation or filtration and is advantageously washed with ether or other volatile solvent. The solid, freed from solvent and wash liquid, is dissolved in warm water and acidified. The precipitated decaborane is removed by filtration or decantation and may be advantageously crystallized for further purification.

Suitable amines for use in the process of the present invention are those containing not more than 8 carbon atoms and include the saturated aliphatic and alicyclic primary, secondary and tertiary amines. Aniline yields an oily product and is less suitable. The secondary aliphatic and alicyclic amines are preferred since they yield particularly well-crystallized products. Examples of suitable secondary amines include dimethylamine, diethylamine, diisopropylamine, morpholine, piperidine and ethylene imine. Suitable primary amines include methylamine, ethylamine, butylamine, ethylene diamine and i-butylamine. Tertiary amines which can be used include trimethylamine and triethylamine.

The novel addition compounds generally are composed of one mole of amine and one mole of decaborane. The addition compound of diethylamine and decaborane appears to have the formula $(C_2H_5)_2NH \cdot B_{10}H_{14}$. Data to support the 1:1 formula are presented in Examples III and IV. The morpholine complex has the analogous formula $O(CH_2CH_2)_2NH \cdot B_{10}H_{14}$. The amine addition compounds with decaborane are well-characterized solids with definite melting points. They are useful as intermediates in the separation and purification of decaborane from dilute solutions.

*Example I*

Three liters of a kerosene solution containing 2.5 percent or about 56 g. of decaborane together with other solid boron hydrides were cooled to 0° C. and 180 ml. of morpholine were added with stirring. The chunky, yellow solid which separated out was broken up and filtered. The solid was slurried with 200 ml. of ether, refiltered and sucked dry. It amounted to 132 g. The entire amount of the additive compound was dissolved in 500 ml. of water at 50° C. The solution was filtered and the filtrate was added to a mixture of 400 g. of chipped ice and 50 ml. of concentrated hydrochloric acid. The light yellow, solid decaborane was filtered off and dried overnight in a vacuum desiccator. It amounted to 54 g. A 34 g. portion of the decaborane was crystallized from a mixture of 33.4 ml. of benzene and 16.6 ml. of carbon tetrachloride (2:1 by volume). Nine grams of the solid was insoluble in the warm mixture and was removed by filtration. Of the 25 g. contained in the filtrate, 16 g. crystallized out on cooling. It was a substantially purified decaborane having a melting point of 90–95° C.

*Example II*

Ethylene imine was introduced into a kerosene solution containing about 2 percent of decaborane, as well as other solid boron hydrides, in molar proportions of about 1 of ethylene imine to 1 of decaborane. The additive compound precipitated as a yellow solid suitable for treatment as in Example I to recover purified decaborane.

*Example III*

Eight ml. (0.0766 mole) of diethylamine was added to a cold solution of 2.0153 g. (0.0165 mole) of decaborane in 180 ml. of heptane. The 3,0635 g. of yellow solid which precipitated was removed by filtration and dried overnight in a vacuum desiccator. It melted at 100° C. with decomposition.

The formula for the additive compound corresponds approximately to $B_{10}H_{14} \cdot (C_2H_5)_2NH$. Since 3.0635 g. of complex were derived from 0.0165 mole of decaborane, the calculated molecular weight of the complex is $$\frac{3.0635}{0.0165}$$

or 185.5. The theoretical molecular weight of the complex is 195.3 based on the 1:1 formula. This indicates that the formula is that of the major portion of the product contaminated by some impurities.

*Example IV*

To 10 ml. of a solution containing 0.000833 gram mole of decaborane in heptane was added 0.4 ml. of diethylamine. The addition complex was filtered and dried in a desiccator. A total of 0.166 g. of addition complex was obtained. The molecular weight of the complex calculated from these data is $$\frac{0.1666}{0.000833}$$

or 200, compared with a theoretical value, based on the 1:1 formula of 195.3.

Decaborane can be used as a vulcanizing agent for organic polymers, including natural and synthetic rubbers.

We claim:

1. A method for the recovery in purified form of decaborane from admixtures thereof and other solid boron hydrides in solution in kerosene which comprises adding to said solution an amine selected from the group consisting of morpholine and ethylene imine, thereby precipitating an addition product of the decaborane and the amine, separating the precipitated addition product from the solution, reacting the precipitate with a mineral acid to free the decaborane, and recovering solid decaborane as a precipitate from the reaction mixture.

2. The method of claim 1 wherein said mineral acid is hydrochloric acid.

3. The method of claim 1 wherein said amine is morpholine and wherein said mineral acid is hydrochloric acid.

4. The method of claim 1 wherein said amine is ethylene imine and wherein said mineral acid is hydrochloric acid.

References Cited in the file of this patent

UNITED STATES PATENTS

| | | |
|---|---|---|
| 1,340,696 | Angel | May 18, 1920 |
| 2,469,879 | Hurd | May 10, 1949 |
| 2,553,198 | Lesesne | May 15, 1951 |
| 2,678,949 | Banus et al. | May 18, 1954 |
| 2,689,868 | Thurston | Sept. 21, 1954 |
| 2,692,879 | Hales | Oct. 26, 1954 |

OTHER REFERENCES

Schechter et al.: "Boron Hydrides and Related Compounds," pages 13 and 37, Jan. 8, 1951, declassified Jan. 5, 1954, Dept. of the Navy, Bureau of Aeronautics.

Walters et al.: "Report No. MSA–9973–FR," pages 2–7, written by W. H. Schechter, Dec. 1, 1950, declassified May 11, 1954.

Hurd: "Chemistry of the Hydrides," pages 78, 84 and 85 (1952).